(12) United States Patent
Smith et al.

(10) Patent No.: US 7,231,804 B1
(45) Date of Patent: Jun. 19, 2007

(54) MULTIPLE SHOCK EVENT SENSING DEVICE

(75) Inventors: Gabriel Smith, Odenton, MD (US); Daniel Jean, Odenton, MD (US); Wade Babcock, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 453 days.

(21) Appl. No.: 11/009,847

(22) Filed: Dec. 9, 2004

(51) Int. Cl.
*G01N 3/08* (2006.01)
*G01N 3/30* (2006.01)

(52) U.S. Cl. .................................... 73/12.07
(58) Field of Classification Search ............... 73/12.02, 73/12.03, 12.04, 12.05, 12.07, 12.09
See application file for complete search history.

(56) References Cited

U.S. PATENT DOCUMENTS

| 5,508,568 | A | 4/1996 | Chen |
| 5,585,566 | A | 12/1996 | Welles et al. |
| 5,811,910 | A | 9/1998 | Cameron et al. |
| 6,104,307 | A | 8/2000 | Hanratty |
| 6,619,123 | B2 | 9/2003 | Gianchandani et al. |
| 6,737,979 | B1 | 5/2004 | Smith et al. |
| 6,765,160 | B1 | 7/2004 | Robinson |
| 7,152,474 | B2 * | 12/2006 | Deb et al. ................. 73/514.32 |
| 7,159,442 | B1 * | 1/2007 | Jean .......................... 73/12.01 |
| 7,194,889 | B1 * | 3/2007 | Jean et al. ................. 73/12.04 |

* cited by examiner

*Primary Examiner*—Michael Cygan
*Assistant Examiner*—Octavia Davis
(74) *Attorney, Agent, or Firm*—Fredric J. Zimmerman

(57) ABSTRACT

A non-electric, multiple shock event sensing device has shock sensors coupled to a substrate and arranged in an array defined by a plurality of rows and at least one column. At any given time, only one row of shock sensors is readied for the detection of a shock event. The occurrence of a shock event is detected by the readied row while simultaneously causing a next successive row in the array to be readied for detection.

18 Claims, 2 Drawing Sheets

MULTIPLE SHOCK EVENT SENSING DEVICE

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to shock sensing devices, and more particularly to a device capable of sensing multiple shock events.

BACKGROUND OF THE INVENTION

Detection and recording of multiple shock events is currently accomplished using a powered accelerometer which provides a continuous electronic signal output that varies with changes in loading conditions. Electronic processing of the signal output is required in order to provide an indication of the changing load conditions. While this arrangement can be used to detect changing load conditions over a wide and continuous range, its inherent need for electrical power makes the use thereof impractical and/or too expensive for many applications.

Recently, the electrical power requirement problem associated with detecting a shock event has been mitigated by a microelectromechanical shock sensor disclosed in U.S. Pat. No. 6,737,979. However, this shock sensor still does not provide a solution for the detection and recording of successively-occurring shock events.

SUMMARY OF THE INVENTION

Accordingly, it is an object of the present invention to provide a shock event sensing device that can detect and record the occurrence of successively-occurring shock events.

Still another object of the present invention is to provide a non-electrical shock event sensing device that can record magnitudes of successively-occurring shock events.

Other objects and advantages of the present invention will become more obvious hereinafter in the specification and drawings.

In accordance with the present invention, a multiple shock event sensing device has shock sensors coupled to a substrate and arranged in an array defined by a plurality of rows and at least one column. Each shock sensor has a moveable portion and a restraining portion mechanically coupled to the moveable portion and fixed to the substrate for fixing a position of the moveable portion. A moveable bar is coupled to the substrate and is positioned between adjacent rows of the shock sensors. Each set of adjacent rows is defined by a first row and a second row. The moveable bar has (i) a contact portion positioned adjacent the moveable portion of each shock sensor in the first row, and (ii) a locking portion mechanically coupled to the moveable portion of each shock sensor in the second row for preventing movement thereof while superseding functioning of the restraining portion of each shock sensor in the second row. Any restraining portion in the first row failing as a result of a shock event allows a corresponding moveable portion to experience movement and engage the contact portion of the moveable bar to cause a corresponding movement of the moveable bar. Movement of the moveable bar mechanically uncouples each locking portion of the moveable bar from the moveable portion of each shock sensor in the second row. Thus, the shock sensors in the second row assume a role equivalent to that of the shock sensors in the first row prior to occurrence of the shock event.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
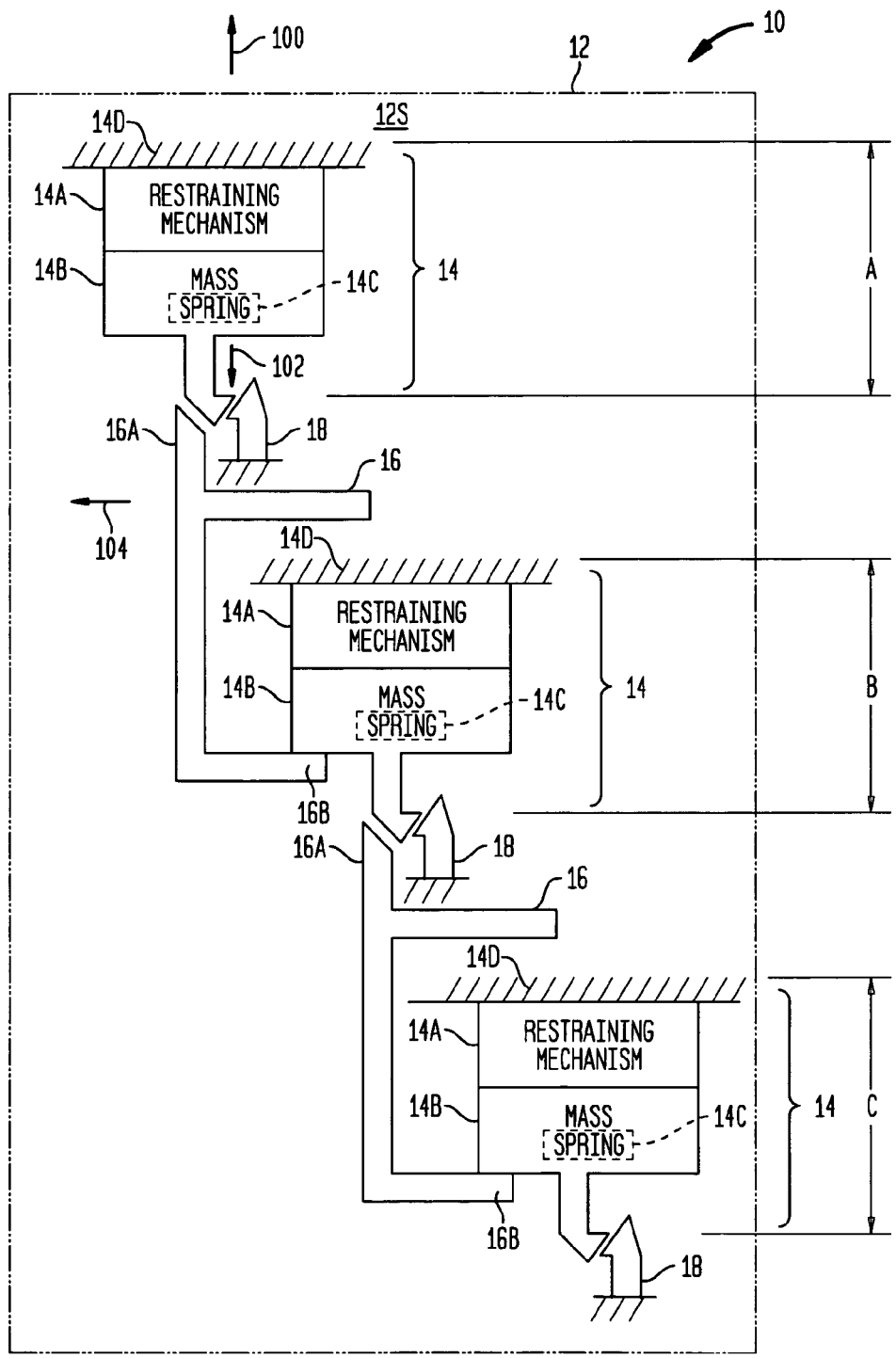
FIG. 1 is a schematic plan view of a multiple shock event sensing device in accordance with one embodiment of the present invention.

Referring now to the drawings, and more particularly to FIG. 1, one embodiment of a multiple shock event sensing device is shown and is referenced generally by numeral 10. Sensing device 10 can be used to sense and record the occurrence of multiple shock events for a variety of different applications ranging from natural or man-made explosive events to impact shocks that might be experienced by shipping containers. Sensing device 10 can also be incorporated as part of a larger system (e.g., a fusing system) designed to be activated upon the occurrence of a particular number of shock events or magnitude thereof. Accordingly, it is to be understood that the particular application of sensing device 10 is not a limitation of the present invention.

Sensing device 10 includes a substrate 12 having a surface 12S on which the remaining components of sensing device 10 are supported. More specifically, a number of shock sensors 14 (e.g., three are shown) are arranged in a column on surface 12S with successive rows in the column being indicated by A, B and C. It is to be understood that the column could have as few as two shock sensors 14 arranged therein or greater than the three shown without departing from the scope of the present invention. Each of sensors 14 has a restraining mechanism 14A and a mass 14B, with mass 14B being coupled to restraining mechanism 14A and movably coupled to surface 12S. Mass 14B of each sensor can be movably supported on surface 12S by, for example, minimally-resistive compliant springs 14C coupled to surface 12S and the underside of mass 14B. Such spring coupling is typically utilized in many implementations of common movable microelectromechanical systems (MEMS) structures as is well known in the art.

Positioned between adjacent rows of shock sensors 14 is a moveable bar 16 coupled to surface 12S. Bar 16 includes a contact region 16A and a locking region 16B where contact region 16A is positioned adjacent mass 14B of one shock sensor 14 and locking region 16B is mechanically coupled to mass 14B of an adjacent one of shock sensors 14 in the next successive row of the column.

Sensing device 10 can be fabricated on the micro scale with any number of currently existing MEMS or other microelectronics manufacturing techniques. These techniques can be used to fabricate the devices from thin metal films, polycrystalline silicon films, or single crystal silicon films and layers. Similarly a device matching the general description and operational mechanism of the present invention could be fabricated at the nanoscale from techniques currently in nascent stages of development. However, based on the current state of the art, it is preferred that sensing device 10 be fabricated using MEMS techniques as described in the previously cited U.S. Pat. No. 6,737,979, the contents of which are hereby incorporated by reference.

In general, restraining mechanism, 14A is any element or collection of cooperating elements that can be fixedly coupled to substrate 12 (as indicated by 14D) such that mass 14B remains in a fixed position until a shock event of specified magnitude causes failure of restraining mechanism 14B at which time mass 14B can experience movement due to the shock event. By way of non-limiting examples, restraining mechanism 14A could take the form of a clamp arrangement providing a clamping force overcome by shock-imparted forces, or a break-away linkage fabricated to fail at a precise stress created by shock-imparted forces. However, the position fixing function of restraining mechanism 14A is superseded when a locking region 16B is mechanically coupled to a mass 14B. Accordingly, for the example illustrated in FIG. 1, shock sensor 14 in row A is held in position by its restraining mechanism 14B whereas shock sensors 14 in rows B and C are held in position by the particular locking region 16B mechanically coupled thereto.

As mentioned above, each shock sensor 14 is constructed such that its restraining mechanism 14A fails (provided its corresponding mass 14B is not restrained by a locking region 16B) in response to a shock event of specified magnitude. By way of example, it will be assumed that each of shock sensors 14 is constructed such that their corresponding restraining mechanisms 14A fail at the same shock event magnitude.

In operation, the occurrence of a shock event of sufficient magnitude (propagating towards the as-illustrated form of device 10 along direction 100) only operates on shock sensor 14 in row A. Upon failure of this sensor's restraining mechanism 14A, the corresponding mass 14B moves in response to the shock event in the direction of arrow 102. Such movement of mass 14B brings about contact with contact region 16A of moveable bar 16 and corresponding movement thereof. Shaping of mass 14B and contact region 16A controls the movement direction of moveable bar 16. For example, such shaping could be designed to bring about a movement direction 104 of bar 16 that is approximately transverse to that of direction 102.

Movement of mass 14B in row A is indicative of a first shock event. The movement could be used to open or close a switch (not shown in FIG. 1), the condition of which could be read in real time or at some time thereafter. Movement of mass 14B in row A also places the position of mass 14B in row B under the control of the particular restraining mechanism 14A associated therewith. That is, while the occurrence of a first shock event is being detected/recorded by shock sensor 14 in row A, the occurrence of the first shock event "unlocks" shock sensor 14 in row B thereby making it sensitive to occurrence of the next shock event while shock sensor 14 in row C remains "locked" by the particular locking region 16B coupled thereto. Bar 16 should be constructed such that the unlocking operation (e.g., occurring in row B) takes longer than the relevant portion of the shock event acting on the previous row (e.g., row A). The above-described operation can continue for each successive shock sensor row.

To assure and fix a post-movement position of a moveable bar 16, a lock 18 coupled to substrate 12 can be used to mechanically cooperate with a corresponding mass 14B (as shown) and/or bar 16. As with the previously-described components, lock 18 can be fabricated using the same fabrication techniques (e.g., MEMS techniques).

Figure 2:
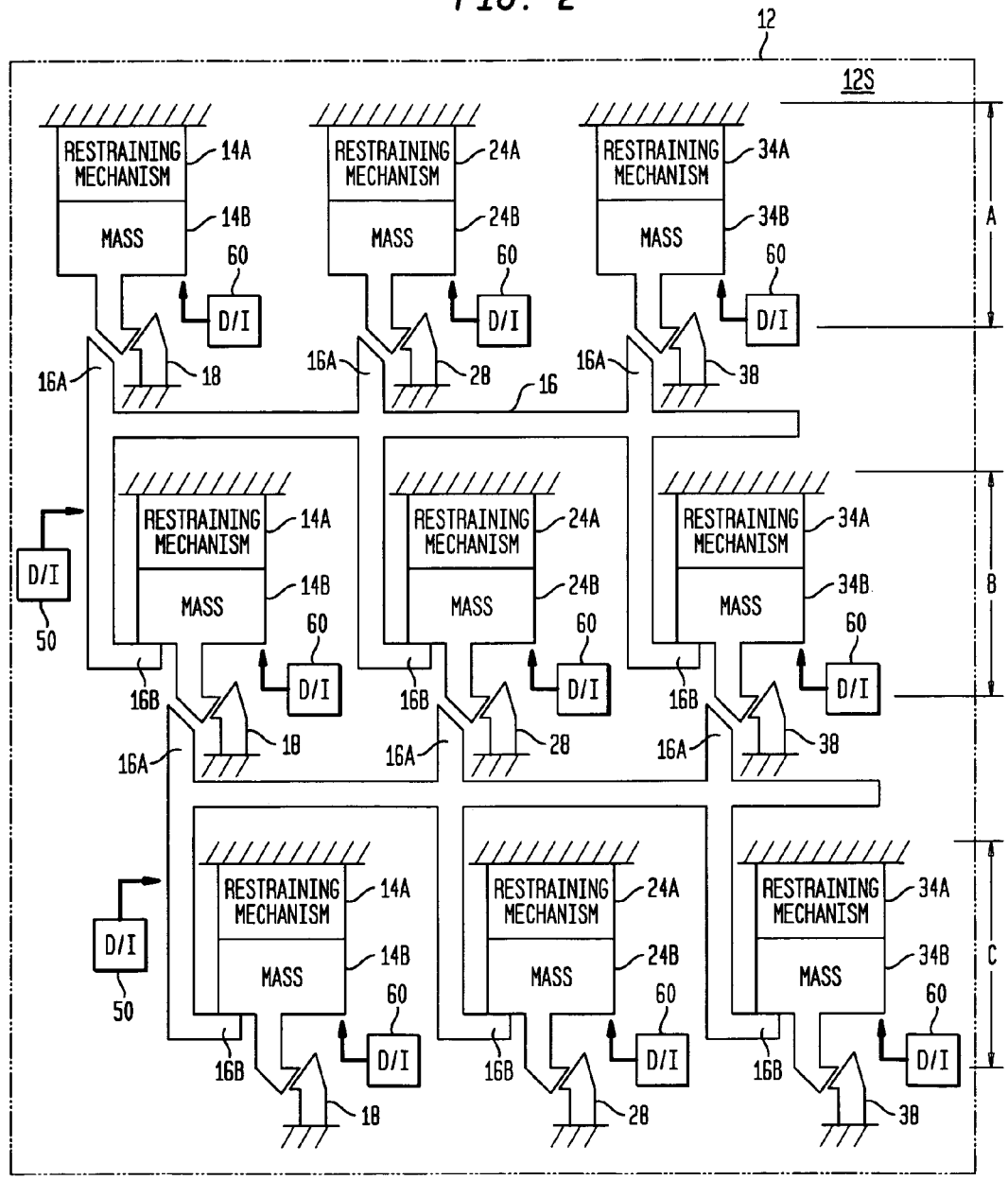
FIG. 2 is a schematic plan view of a multiple shock event sensing device in accordance with another embodiment of the present invention.

While the basic principles of the present invention have been described for a single column of shock sensors, the present invention can readily be expanded to a multi-column, multi-row array or matrix (e.g., a rectangular matrix) of shock sensors as illustrated in FIG. 2. Successive columns in FIG. 2 have their componentry delineated by the tens digit value of the corresponding reference numerals. It is to be understood that each shock sensor in the matrix is constructed in a similar fashion to that described above with respect to FIG. 1. However, for clarity of illustration, some of the elements illustrated in FIG. 1 have been omitted from FIG. 2.

In the FIG. 2 embodiment, each column can be designed such that it's restraining mechanisms will fail (provided a restraining mechanism's function is not superseded by an engaging locking portion of a particular moveable bar 16) at the same shock event magnitude with each column being associated with a unique shock event magnitude. Thus, each row of this type of sensing device is capable of sensing a plurality of shock event magnitudes. Note that a low shock event magnitude might only "trip" one shock sensor in a row whereas a high shock event magnitude could "trip" all shock sensors in a row. However, it is only required that one shock sensor's restraining mechanism in a row fail to bring about movement of the sensor's mass and corresponding movement of the particular bar 16 associated therewith. Therefore, in the illustrated example, if one or more than one of restraining mechanisms 14A, 24A and 34A in row A fails in response to a shock event, the ensuing movement of the corresponding shock sensor mass and bar 16 unlocks the shock sensors in row B to ready same for detection of the next shock event. Similar to sensing device 10, one or more of locks 18, 28, 38 and 48 can be used to fix the post-movement position of a bar 16 to assure the ready state for the next successive row of shock sensors.

For the device illustrated in FIG. 2, the tripping of any shock sensors in a row is indicative of the occurrence of a shock event whereas the particular one (or ones) of tripped shock sensors is, indicative of the magnitude of a shock event. Accordingly, it may be desirable to provide an event detector/indicator ("D/I") 50 (e.g., a contact switch) to detect/indicative movement of a bar 16 as a means to indicate the occurrence of a shock event. It may be desirable to additionally or alternatively provide a magnitude detector/indicator ("D/I") 60 (e.g., a contact switch) that can individually detect and indicate the movement of each shock sensor mass to thereby indicate the magnitude of each shock event.

The advantages of the present invention are numerous. Multiple shock events can be detected and recorded by a fully mechanical system that requires no electricity to operate. Each shock event can be greater or less than the previous event. The present invention readily lends itself to MEMS fabrication techniques so that a multiple shock event sensing device can be fabricated in a small package and for less cost than current state-of-the art multiple shock event sensors.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A multiple shock event sensing device, comprising:
   a substrate;
   shock sensors coupled to said substrate and arranged in an array defined by a plurality of rows and at least one column, each of said shock sensors having a moveable portion and a restraining portion mechanically coupled to said moveable portion and fixed to said substrate for fixing a position of said moveable portion; and
   a moveable bar coupled to said substrate and positioned between adjacent rows from said plurality of rows wherein each of said adjacent rows is defined by a first row and a second row, said moveable bar having a contact portion positioned adjacent said moveable portion of each of said shock sensors in said first row, said moveable bar further having a locking portion mechanically coupled to said moveable portion of each of said shock sensors in said second row for preventing movement thereof while superseding functioning of said restraining portion of each of said shock sensors in said second row, wherein any said restraining portion in said first row failing as a result of a shock event allows a corresponding said moveable portion to experience movement and engage said contact portion of said moveable bar to cause a corresponding movement of said moveable bar that mechanically uncouples each said locking portion of said moveable bar from said moveable portion of each of said shock sensors in said second row, wherein said shock sensors in said second row assume a role equivalent to that of said shock sensors in said first row prior to occurrence of said shock event.

2. A multiple shock event sensing device as in claim 1 wherein said at least one column comprises a plurality of columns, and wherein each said restraining portion associated with a column from of said plurality of columns is constructed to fail at an identical shock event magnitude.

3. A multiple shock event sensing device as in claim 2 wherein each column from of said plurality of columns is associated with a unique shock event magnitude.

4. A multiple shock event sensing device as in claim 1 wherein said shock sensors and each said moveable bar are microelectromechanical systems (MEMS)-type devices.

5. A multiple shock event sensing device as in claim 1 wherein each said moveable portion and each said moveable bar is constructed such that said corresponding movement is approximately transverse to said movement of said moveable portion.

6. A multiple shock event sensing device as in claim 1 wherein said plurality of rows and said at least one column comprise a rectangular matrix.

7. A multiple shock event sensing device as in claim 1 further comprising means for detecting said movement of each said moveable portion and for providing an indication thereof.

8. A multiple shock event sensing device as in claim 1 further comprising means for detecting said corresponding movement of each said moveable bar and for providing an indication thereof.

9. A multiple shock event sensing device as in claim 8 further comprising means for detecting said movement of each said moveable portion and for providing an indication thereof.

10. A multiple shock event sensing device as in claim 1 further comprising locking means coupled to said substrate for fixing a position of each said moveable bar immediately following said corresponding movement thereof.

11. A multiple shock event sensing device, comprising:
    a substrate;
    microelectromechanical systems (MEMS)-based shock sensors coupled to said substrate and arranged in an array defined by a plurality of rows and at least one column, each of said shock sensors having a moveable portion and a restraining portion mechanically coupled to said moveable portion and fixed to said substrate for fixing a position of said moveable portion;
    a MEMS-based moveable bar coupled to said substrate and positioned between adjacent rows from said plurality of rows wherein each of said adjacent rows is defined by a first row and a second row, said moveable bar having a contact portion positioned adjacent said moveable portion of each of said shock sensors in said first row, said moveable bar further having a locking portion mechanically coupled to said moveable portion of each of said shock sensors in said second row for preventing movement thereof while superseding functioning of said restraining portion of each of said shock sensors in said second row, wherein any said restraining portion in said first row failing as a result of a shock event allows a corresponding said moveable portion to experience movement and engage said contact portion of said moveable bar to cause a corresponding movement of said moveable bar that mechanically uncouples each said locking portion of said moveable bar from said moveable portion of each of said shock sensors in said second row, wherein said shock sensors in said second row assume a role equivalent to that of said shock sensors in said first row prior to occurrence of said shock event; and
    locking means coupled to said substrate for fixing a position of each said moveable bar immediately following said corresponding movement thereof.

12. A multiple shock event sensing device as in claim 11 wherein said at least one column comprises a plurality of columns, and wherein each said restraining portion associated with a column from of said plurality of columns is constructed to fail at an identical shock event magnitude.

13. A multiple shock event sensing device as in claim 12 wherein each column from of said plurality of columns is associated with a unique shock event magnitude.

14. A multiple shock event sensing device as in claim 11 wherein each said moveable portion and each said moveable bar is constructed such that said corresponding movement is approximately transverse to said movement of said moveable portion.

15. A multiple shock event sensing device as in claim 11 wherein said plurality of rows and said at least one column comprise a rectangular matrix.

16. A multiple shock event sensing device as in claim 11 further comprising means for detecting said movement of each said moveable portion and for providing an indication thereof.

17. A multiple shock event sensing device as in claim 11 further comprising means for detecting said corresponding movement of each said moveable bar and for providing an indication thereof.

18. A multiple shock event sensing device as in claim 17 further comprising means for detecting said movement of each said moveable portion and for providing an indication thereof.

* * * * *